(12) United States Patent
Zheng et al.

(10) Patent No.: US 9,077,713 B1
(45) Date of Patent: Jul. 7, 2015

(54) TYPELESS SECURE LOGIN TO WEB-BASED SERVICES

(71) Applicant: Google Inc., Mountain View, CA (US)

(72) Inventors: Wentao Zheng, Mountain View, CA (US); Zutao Zhu, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/474,491

(22) Filed: Sep. 2, 2014

(51) Int. Cl.
| | |
|---|---|
| *G06F 21/00* | (2013.01) |
| *H04L 29/06* | (2006.01) |
| *G06F 21/36* | (2013.01) |
| *H04W 12/00* | (2009.01) |
| *H04L 9/32* | (2006.01) |
| *H04W 12/06* | (2009.01) |
| *G06F 21/62* | (2013.01) |
| *G06F 21/30* | (2013.01) |

(52) U.S. Cl.
CPC ............ *H04L 63/0853* (2013.01); *G06F 21/36* (2013.01); *H04W 12/00* (2013.01); *H04L 9/3228* (2013.01); *H04L 63/08* (2013.01); *H04W 12/06* (2013.01); *G06F 21/62* (2013.01); *G06F 21/6245* (2013.01); *H04L 9/32* (2013.01); *H04L 63/10* (2013.01); *G06F 21/30* (2013.01)

(58) Field of Classification Search
CPC ............ H04L 63/10; H04L 9/32; H04L 9/08; H04L 2463/082; G06F 17/30; G06F 21/03; G06F 21/04; G06F 21/06; G06F 2211/003; G06F 2221/2129; G06F 2221/2141

USPC .................... 726/1–21, 26–30; 713/168–186; 709/217–229
See application file for complete search history.

(56) References Cited

U.S. PATENT DOCUMENTS

| | | | | |
|---|---|---|---|---|
| 7,089,585 | B1 * | 8/2006 | Dharmarajan | 726/8 |
| 2007/0245422 | A1 * | 10/2007 | Hwang et al. | 726/26 |
| 2010/0070759 | A1 * | 3/2010 | Leon Cobos et al. | 713/155 |
| 2010/0242096 | A1 * | 9/2010 | Varadharajan et al. | 726/4 |
| 2010/0275010 | A1 * | 10/2010 | Ghirardi | 713/155 |
| 2013/0111208 | A1 * | 5/2013 | Sabin et al. | 713/171 |
| 2013/0179692 | A1 * | 7/2013 | Tolba et al. | 713/179 |

(Continued)

OTHER PUBLICATIONS

Liao, Kuan-Chieh, and Wei-Hsun Lee. "A novel user authentication scheme based on QR-code." Journal of Networks 5.8 (2010): 937-941.*

(Continued)

*Primary Examiner* — Madhuri Herzog
(74) *Attorney, Agent, or Firm* — Fox Rothschild LLP (57) ABSTRACT

A system provides a remote electronic device with secure access to a web service. The system generates an alphanumeric character set, encodes the character set in a barcode, and outputs the barcode on a login page. When the system receives an access request from a remote electronic device, it will determine whether the request or a following communication includes the character set and a unique identifier for an authentication application that is installed on the remote electronic device. If so, then the system will use the unique identifier to identify a user account for a user who is using the remote device, generate a home page that includes one or more functions for which the user account is authorized, and output the home page. The system will output the home page in a manner that permits the remote electronic device to securely access and display the home page.

24 Claims, 6 Drawing Sheets

(56) References Cited

U.S. PATENT DOCUMENTS

2014/0250518 A1* 9/2014 Schneider ..................... 726/9
2014/0310185 A1* 10/2014 Staflin .......................... 705/71

OTHER PUBLICATIONS

Starnberger, Guenther, Lorenz Froihofer, and Karl M. Göschka. "QR-TAN: Secure mobile transaction authentication." Availability, Reliability and Security, 2009. ARES'09. International Conference on. IEEE, 2009.*

Dodson, Ben, et al. "Secure, consumer-friendly web authentication and payments with a phone." Mobile Computing, Applications, and Services. Springer Berlin Heidelberg, 2012. 17-38.*

Oh, Dong-Sik, Bong-Han Kim, and Jae-Kwang Lee. "A study on authentication system using QR code for mobile cloud computing environment." Future Information Technology. Springer Berlin Heidelberg, 2011. 500-507.*

Kim, Young-Gon, and Moon-Seog Jun. "A design of user authentication system using QR code identifying method." Computer Sciences and Convergence Information Technology (ICCIT), 2011 6th International Conference on. IEEE, 2011.*

Lee, Young Sil, et al. "Online banking authentication system using mobile-OTP with QR-code." Computer Sciences and Convergence Information Technology (ICCIT), 2010 5th International Conference on. IEEE, 2010.*

Choi, Kyeongwon, et al. "A mobile based anti-phishing authentication scheme using QR code." Mobile IT Convergence (ICMIC), 2011 International Conference on. IEEE, 2011.*

SQRL (Secure Quick Reliable Login) information, downloaded from https://www.grc.com/sqrl/sqrl.htm, Jul. 14, 2014.

Quick authentication using mobile devices and QR Codes, "TOZNY", Galois News, Open Source, White Papers, Jan. 5, 2011.

* cited by examiner

TYPELESS SECURE LOGIN TO WEB-BASED SERVICES

BACKGROUND

Many web-based services require login credentials. E-commerce websites, streaming media services, social media applications, mail and other messaging services, cloud-based storage systems and many other services require login credentials to ensure that an entity who attempts to access a service is authorized to do so.

The most common form of login credential is a password. However, a user may forget a password after the passage of time. In addition, if a user is not careful to keep his or her password secret, the password may be compromised by others. Although methods such as one time password (OTP) generation have improved upon password-based login methods, it remains desirable to find additional ways to improve the process for logging in to web-based services.

This document describes methods and systems that may address issues such as those described above.

SUMMARY

In an embodiment, a system provides a remote electronic device with secure access to a web service. The system generates an alphanumeric character set, encodes the character set in a barcode, and outputs the barcode on a login page. When the system receives an access request from a remote electronic device, it will determine whether the request or a following communication includes the character set and a unique identifier for an authentication application that is installed on the remote electronic device. If so, then the system will use the unique identifier to identify a user account for a user who is using the remote device, generate a home page that includes one or more functions for which the user account is authorized, and output the home page. The system will output the home page in a manner that permits the remote electronic device to securely access and display the home page.

Optionally, before receiving the request to access the web service, the system may receive an authentication request. The authentication request may include an authentication credential that corresponds to the user account and the unique identifier. If so, the system may associate the unique identifier with the user account.

In some embodiments, after passage of at least a threshold period of time, the system may receive a second instance of the character set and the unique identifier. If so, the system may use the second instance of the unique identifier to identify the user account, and it may use the second instance of the character set to identify a user session. The system may then output an updated instance of a web page that corresponds to the user session, and it may permit the remote electronic device to access and display the updated instance of the web page.

Optionally, the system may receive a device parameter from the remote electronic device. If the device parameter is of the type that the system's knowledge base or rule set indicates may represent a suspicious request, the system may use the device parameter to classify the request to access the web service as a suspicious request. In response to classifying the request as a suspicious request, the system may generate a command for an authentication credential. It may then wait and only permit the remote electronic device to access and display the home page if and after the processor receives an indication that the remote electronic device has received the authentication credential from a user of the device.

In some embodiments, outputting the barcode on the login page may include generating the web page and serving it for access by a second remote electronic device. Also, in some embodiments the second remote electronic device and the device from which the request is received may be different devices.

In another embodiment, a mobile electronic device is programmed with an authentication application and a barcode scanning application. The two applications may be a combined application or separate applications. When the authentication application detects that the device receives an access request for a web service, the device will use a browsing application to access a login page of the web service. If device has already been authenticated to the web service, the device may then connect to the web service. If the device has not already been authenticated, then the authentication application may prompt the user to scan a barcode that is displayed on another electronic device.

When the mobile device scans the barcode, the authentication application will cause the device to send the extracted barcode data and the authentication application's unique identifier to the web service so that the web service can use that data to identify the device's user. The web service will return an address for a home page that is associated with the user account or another page that the user is authorized to access. When the device receives the web page address, it will use a client application (such as a browser) to access the page and display the web page on a display of the device. The client application also may be a separate application, or it may be part of the authentication application and/or the browsing application.

When the mobile device executes the authentication application, a user may input and the device may receive an authentication credential for the web service. The device may pass the authentication credential and the unique identifier to the web service to associate the unique identifier with the user account. The authentication credential will generally correspond to the user account so that the service can identify the user by matching the received credential to a known credential.

Optionally, before displaying the web page, the device may present the user with a prompt to verify the request to access the web service. It may then wait to receive a response to the prompt, and only display the web page after the response is received. The prompt may be, for example, a request to enter an authentication credential. If so, then the response to the prompt may be the authentication credential.

Optionally, when the device uses the client application to automatically access the web page, the device may open a hypertext transfer protocol connection to the web service, wait for a confirming message from the web service, and display the web page on the display only if the confirming message is received before a timeout threshold. Otherwise, if the confirming message is not received before the timeout threshold, the device may scan an updated barcode to extract updated barcode data, and it may pass the updated barcode data and the unique identifier to the web service.

In any of the various embodiments described above and elsewhere in this document, the method may be performed without a requirement to pass an encryption key from the device to the web service at any of the steps described above.

DETAILED DESCRIPTION

Glossary

In this document:

An "authentication application" is a set of programming instructions that, when executed by processor of an electronic device, authenticates the device to a web service. In the embodiments disclosed in this document, an authentication application includes a unique identifier that the web service can use to identify an account with which a user of the device is associated. An authentication application may be a stand-alone program or a portion of another program, such as a client application.

An "authentication credential" is a unique data element or set of data elements that a web service uses to validate a user or an electronic device to the service. A service may require each user of the service to have a unique authentication credential, although in some service authentication credentials (or portions of authentication credentials) may be shared by two or more users. Examples of authentication credentials include passwords, username/password combinations, biometric credentials and the like.

"Barcode data" means data that is encoded into an optical machine-readable representation. The machine-readable representation will be a pattern or symbol that contains the encoded barcode data. Examples of such machine-readable representations include Universal Product Codes, two-dimensional barcodes such as matrix codes, Quick Response ("QR") codes, Aztec codes, and three-dimensional barcodes.

A "client application" is a set of programming instructions that, when executed by a processor of an electronic device, retrieves information from a web service and presents the retrieved information to a user of the electronic device. A browsing application such as a web browser is an example of a client application. Example types of information that a client application may retrieve include a web page, an electronic file, a streaming audio or video file, an image or other data.

"Comprising" means "including, but not limited to."

An "electronic device" is a device that includes a processor and non-transitory computer-readable memory. The memory contains programming instructions in the form of a software application that, when executed by the processor, causes the device to perform various operations according to the programming instructions. Examples of electronic devices include smartphones, personal digital assistants, cameras, tablet devices, electronic readers, personal computers, media players, satellite navigation devices and the like. A "mobile electronic device" is an electronic device that is portable, such as a smartphone, personal digital assistant, cameras, or tablet computing device.

An "encryption key" or "key" is a piece of information that is used to determine the functional output of a cryptographic algorithm or cipher. Some keys may be used encrypt data, some keys may be used to decrypt data, or some keys may be used in both encryption and decryption processes.

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

A "scanning application" is a set of programming instructions that, when executed by a processor of an electronic device, causes an image sensor of the electronic device to capture an image of a barcode, and which processes the captured image to determine the barcode data that is encoded in the barcode.

A "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments.

A "web service" is a function or set of functions that can be accessed by an electronic device over a communications network (such as the World Wide Web) via a communications protocol such as hypertext transfer protocol. Examples of web services include, without limitation, e-commerce websites, streaming media services, social media applications, mail and other messaging services, cloud-based storage systems and other services.

DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art.

Figure 1:
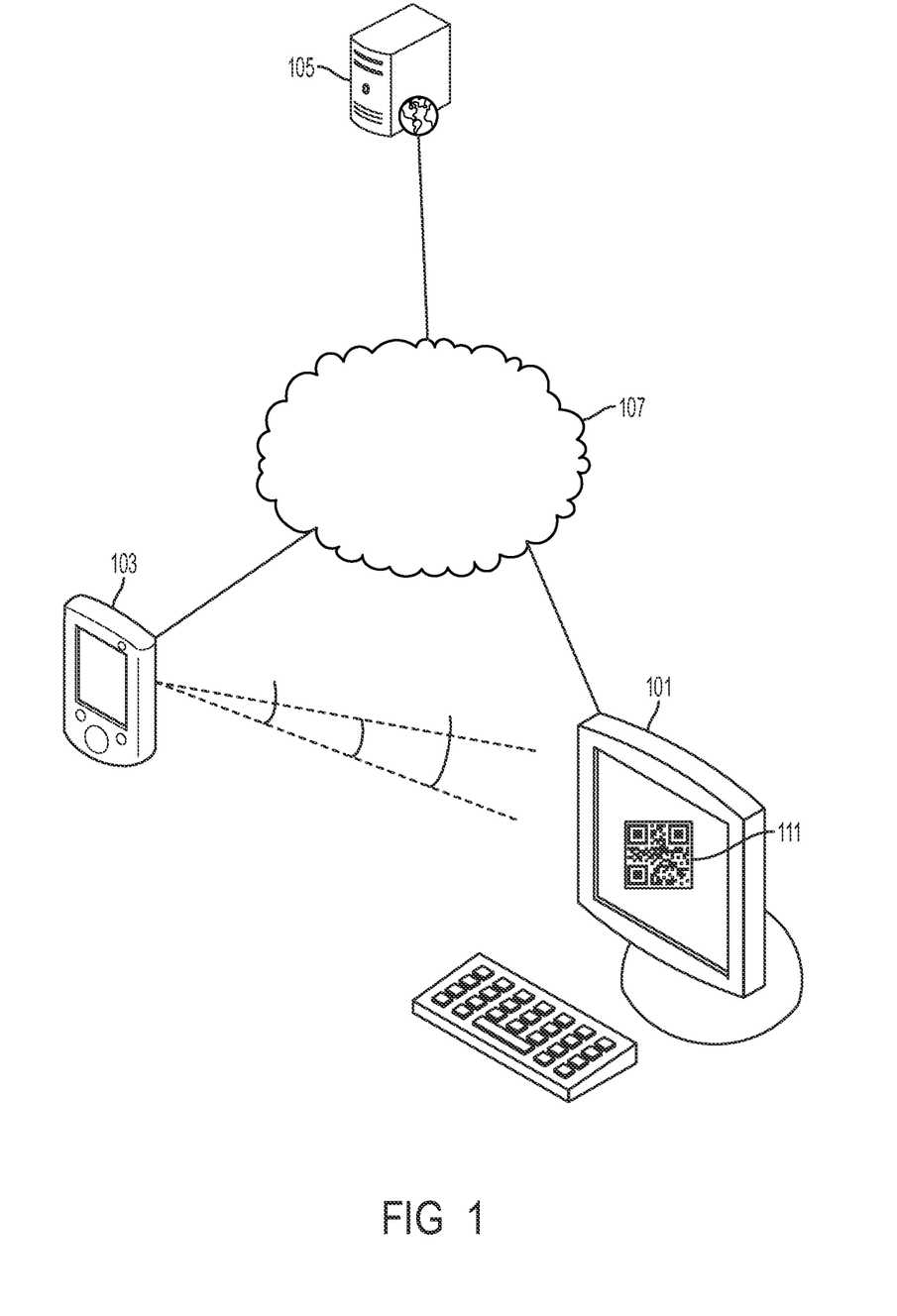
FIG. 1 shows several devices that may be used in the embodiments described in this document.

FIG. 1 shows several devices that may be used in the context of the discussion below. A first electronic device 101 and a second electronic device 103 will include communication components that enable each device to communicate with a remote web service provider electronic device 105 via one or more communication networks 107. As shown, the first electronic device 101 is a desktop computer with display, while the second electronic device 103 is a mobile electronic device such as a smartphone or tablet computer. However, each component may be any suitable electronic device, such as those described in more detail below. It is only required that the second electronic device 103 include an image sensor such as a camera, as well as an installed scanning application. The second electronic device 103 will also include installed programming instructions for an authentication application that the second device 103 will use to access the web service. The authentication application will include a unique identifier that the web service may use to identify the device on which the authentication application is installed. The first electronic device 101 will include a display so that it can output an image of a barcode 111 that the second electronic device can scan. Other example components of each device will be described in more detail below.

The web service provider 107 also includes one or more electronic devices that make a web service accessible to remote electronic devices. As noted above, the web service will include one or more web pages that are made available to remote user device. At least some of the web pages will be secure web pages having content that may be accessed only by an authorized user's device. The security of at least some of the pages will be implemented by the processes described below, and will not require the exchange of any encryption keys for authentication. In addition, in some embodiments, the web service provider makes multiple web services available. Examples of multiple services may include a mail service, a social network and a file storage service. In such embodiments, when a device is authenticated to one of the available web services, the web service provider may automatically consider the device to be authenticated to one or more of the additional services without requiring the device to provide any further authentication credentials or actions.

Figure 2:
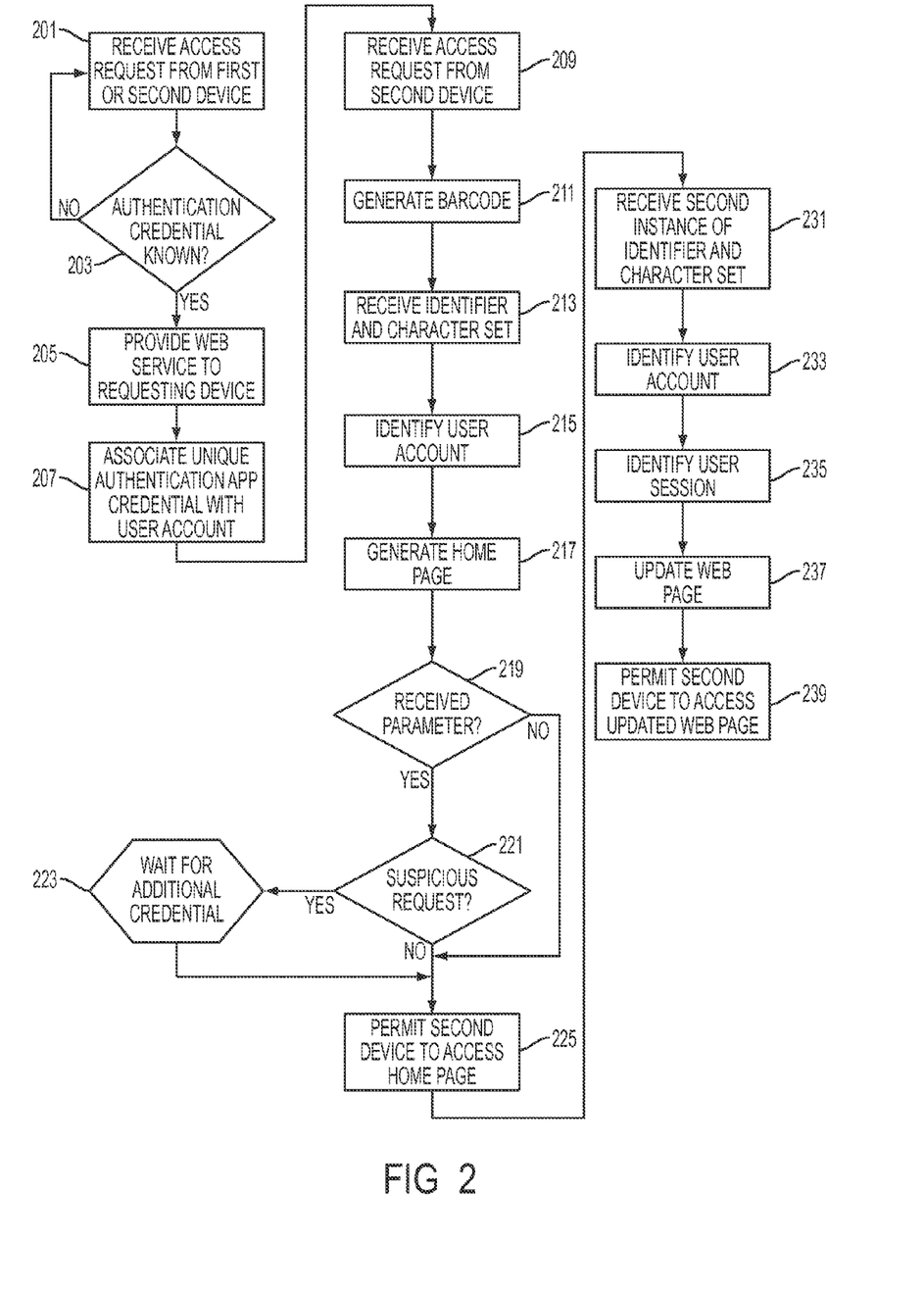
FIG. 2 is a flowchart illustrating steps that a web service provider may implement when it receives a request from a remote electronic device.

FIG. 2 is a flowchart illustrating steps that a web service provider may implement to provide a web service to a requesting device. As an initialization step, when the service receives an access request from one of the devices 201 (i.e., either the first device 101 or the second device 103 of FIG. 1), it will require that the access request include an authentication credential. The authorization credential may be any suitable credential or combination of credentials, such a username and password, a biometric identifier, an encryption key, or another credential. If an encryption key is used, the authentication step may be the only step in which the key is required. All other steps may include non-encryption based authentication, such as password-based authentication.

When the web service provider receives the authentication credential, it will confirm that the authentication credential corresponds to a known credential for an authorized user of the service 203. When it determines that the request came from an authorized user, the web service provider may make at least a portion of the web service available to the requesting device 205. Otherwise, it may limit or deny access to the web service until the requesting device presents the authentication credential.

In the initialization process, the web service provider will also receive the unique identifier for the authentication application and associate the unique identifier with the user's account data by storing the identifier in a memory 209. If the initial request came from the first electronic device (i.e., the device 101 that does not have the installed authentication application), it may generate a web page that includes a prompt for a user to enter the unique identifier. If the initial request came from the second electronic device 103 (which has the installed authentication identifier), the web service may prompt the user of the second electronic device to enter or transmit the identifier, or the authentication application may automatically transmit the identifier to the web service provider without the need for any additional user action.

If the initial request came from the second electronic device 103, the web service provider will also require the first electronic device 101 to authenticate itself to the web service, using any suitable process such as the processes described above. However, if the initial request and initialization step came from the first electronic device 101, the system may, in some embodiments, not require any entry of a username or password in order to authenticate the second device to the web service. Instead, authentication may follow processes such as those described below.

Returning to FIG. 2, when the web service provider receives an access request 209 from the second electronic device, the web service provider may generate an alphanumeric character set, encode the character set in a barcode, and output the barcode 211 on a login page that the first device may access and display. The barcode generation may be performed in response to the access request, or it may be done prior to receipt of any access request. The system may generate the alphanumeric character set in a random fashion, subject to one or rules (such as size), using data that is associated with a user account, sequentially, or by other methods. Although not a requirement in all embodiments, the alphanumeric character set will typically have a limited duration, such as a one-time use, or a time limit in which it may be used. After the limited duration the character set will no longer be associated with the user account.

In order to permit the second device to access the web service, the web service will require the second electronic device to present the barcode's character set and the unique identifier for the device's authentication application. When the web service provider receives a submitted character set and a submitted authentication application identifier 213, it will use the two received data points to identify the user's account for which the submitted identifiers match 215. In this way, the web service provider may identify the user account for the user who is using the second device. When the web service provider identifies the user account, it will generate and output a home page that includes one or more functions for which the user account is authorized 217. The web service will permit the second electronic device to access and display the generated home page 225 so that the authorized user of the device may access permitted functions of the web service.

Optionally, before permitting the electronic device to access the functions, the web service may take one or more additional security actions to confirm that the request should not be considered a potentially suspicious request. For example, the web service may receive one or more device parameters 219 from the requesting electronic device. For example, the received parameters may include a geographic location (received from a global positioning system function of the device), a time of day, a period of time since the last request from the device or other parameters. The system may then compare the received parameters to user profile data in the user's account to determine whether the received parameters correspond to known data in the user account (and thus are expected and not suspicious), deviate from typical usage of the user (in which case the request may be designated suspicious), or match one or more categorically designated parameters of suspicion (such as access from certain geographic locations, or simultaneous access by two or more devices). Based on this comparison, the system will determine whether or not to classify the request as a suspicious request 221. If the request is designated as a suspicious request, the web service will generate a command that the user of the requesting device provide an additional authentication credential 223. In this situation, the web service and/or authentication application will wait and not permit the electronic device to access and display the home page until the web service receives an indication that the remote electronic device has received the authentication credential from a user of the device. This indication may be transmission of the authentication credential itself, or a communication from the authentication application indicating that the authentication credential was received.

In some embodiments, the web service may improve security by limiting the time of an open web session to a threshold. However, if the user is re-authenticated within a threshold time from that limit, the web service may continue the session so that the user does not have to take any action to keep the session active. Or, if a connection between the device and the web service is dropped, the web service may re-establish the user's browsing session automatically, without requiring user action. In one embodiment, the system may do this by: receiving a second instance of the character set and the unique identifier from the second electronic device 231; using the second instance of the unique identifier to identify the user account 233; using the second instance of the character set to identify a user session 235 (such as by analyzing data in the user's stored profile to determine what web page or functions the user was accessing when the user last accessed the service); outputting an updated instance of a web page that corresponds to the user session 237 (such as the user's home page, or the last page that the user accessed); and permitting the remote electronic device to access and display the updated instance of the web page 239.

Figure 3:
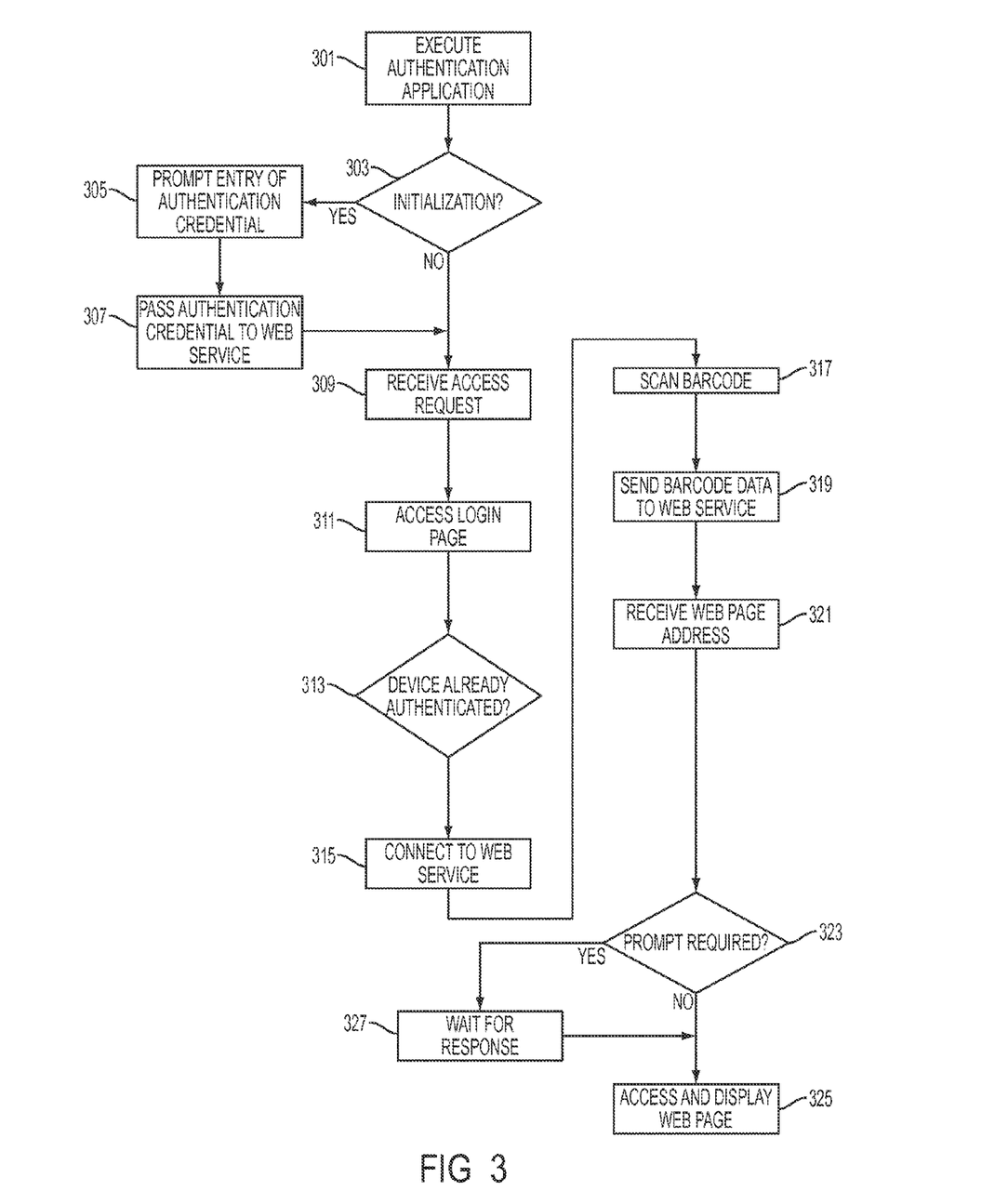
FIG. 3 is a flowchart illustrating an example of the process of FIG. 2 taken in the context of one or both of the user devices.

FIG. 3 is a flowchart illustrating various example process steps viewed from the context of the user electronic devices (i.e., devices 101 and 103 of FIG. 1). The mobile electronic device (103 of FIG. 1) will have an authentication application installed. The authentication application will include a unique identifier that a remote web service has associated with a particular user's account. The authentication application may be a web service access application such as a browser, another application or portion thereof whose operation is initiated by the device's user, or a background application that the user does not need to activate in order to operate. Referring to FIG. 3, the device will execute the authentication application 301, and when the device receives an access request for a web service 309, it will use a browsing application to access a login page of the web service 311. The access request may be, for example, a web page address, or a request to initiate an installed application that then accesses the web page.

Upon receipt of an access request, the web service or the authentication application may determine whether the device has already been authenticated to the web service 313. If the device is already authenticated to the web service (as may be the case if a browsing session was interrupted), the device may then reconnect to the web service 315, either at the last page accessed (as may be the case if an interruption occurred) or at a home page that is associated with the user account. On the other hand, if the device has not already been authenticated, then the authentication application may cause a display of the mobile electronic device to display, cause a speaker of the device to audibly output, or otherwise cause the device to present the user with a prompt to capture a barcode that is displayed on the other electronic device.

When the device scans the barcode 317 by executing a scanning application, it will decode the barcode to extract barcode data that includes an alphanumeric character set that the web service has also associated with the user's account. The authentication application will cause the device to send the extracted barcode data and the authentication application's unique identifier to the web service 319 so that the web service can use that data to identify the device's user. The web service will return an address for a home page that is associated with the user account or another page that the user is authorized to access. When the device receives the web page address 321, it will use a client application (such as a browser) to access the page and display the web page on a display of the device 325. In various embodiments, the method may be performed without a requirement to pass an encryption key from the device to the web service at any of the steps described above.

In some embodiments, before processing the access request, the authentication application may cause the device to execute an initialization function 303. If so, the application may cause the device to prompt the user to enter an authentication credential 305 such as a username and password. When the device receives the authentication credential it will pass the credential and the application's unique identifier to the web service 307 so that the web service may associate the unique identifier with the user account that corresponds to the authentication credential.

In some embodiments, as an additional security step, the authentication application may present the user with a prompt before displaying the web page 323. If so, the authentication application may wait to receive a response to the prompt 327, and only display the web page 325 after the response is received. For example, the prompt may require the user to verify the access request, or to enter an additional authentication credential such as a password or response to a question. Conditions that may, if present, cause the application to generate the prompt may include factors such as the passage of a certain period of time, the classification of a request by the application or the web service as a suspicious request, or other factors.

In addition, in some embodiments, when accessing the web page 325, the application may cause the electronic device to open a hypertext transfer protocol connection to the web service, wait for a confirming message from the web service, and display the web page on the display only if the confirming message is received before a timeout threshold. Otherwise, if the confirming message is not received before the timeout threshold, then the authentication application may cause the device to capture an image of an updated barcode at an updated login page, extract updated barcode data, and pass the updated barcode data and the unique identifier to the web service.

Figure 4:
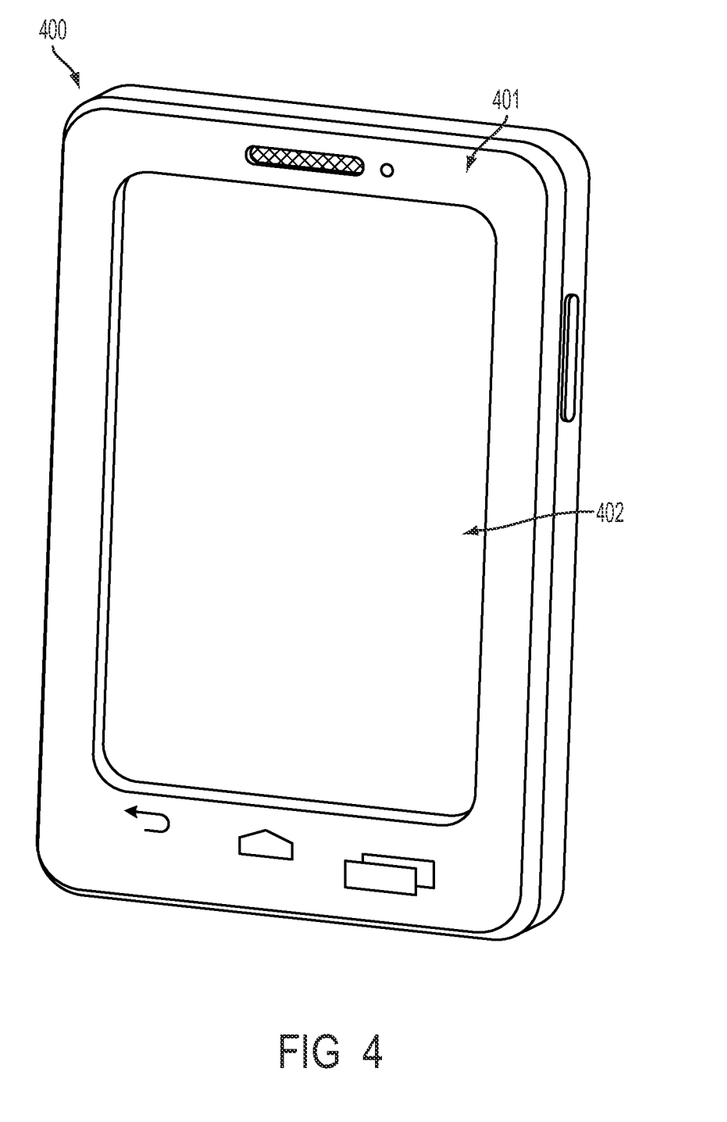
FIGS. 4 and 5 illustrate an example of a mobile electronic device.

FIG. 4 shows one example of a mobile electronic device 400 that may be used in embodiments discussed above. The mobile electronic device 400 may include a front face 402 and a display 404. The display 404 may be any suitable component for displaying images, including, but not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays. The display 404 may further include a touch sensitive screen, including, but not limited to, resistive touchscreens, capacitive touchscreens, and infrared touchscreens.

Figure 5:
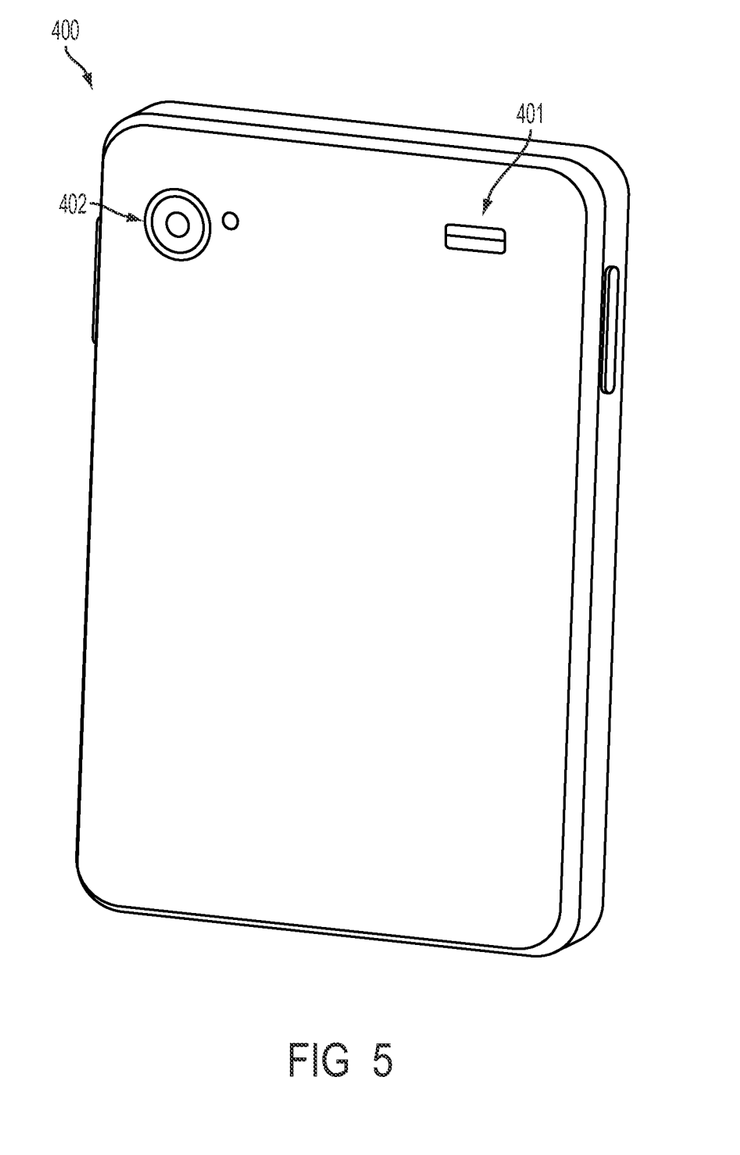

FIG. 5 shows a rear face 402 of the mobile electronic device 400. The rear face 402 may include an image capture device 404 that includes an image sensor. The image capture device 404 may be any suitable component capable of receiving an optical image and transmitting the information to other components for processing. While the image capture device 404 is depicted on the rear face of the present example, persons skilled in the art will appreciate that the imaging device 404 may be positioned at any location upon any face of the mobile device 400, or it may even be external to the mobile device 400 and connected by any means of electronic communication, including, but not limited to, physical cable communication such as universal serial bus (USB), wireless radio communication, wireless light communication, or near field communication technology.

The configuration of the mobile device 400 as shown in FIGS. 4 and 5 is only an example, and persons skilled in the art will appreciate other configurations that are able to achieve a similar overall result.

Figure 6:
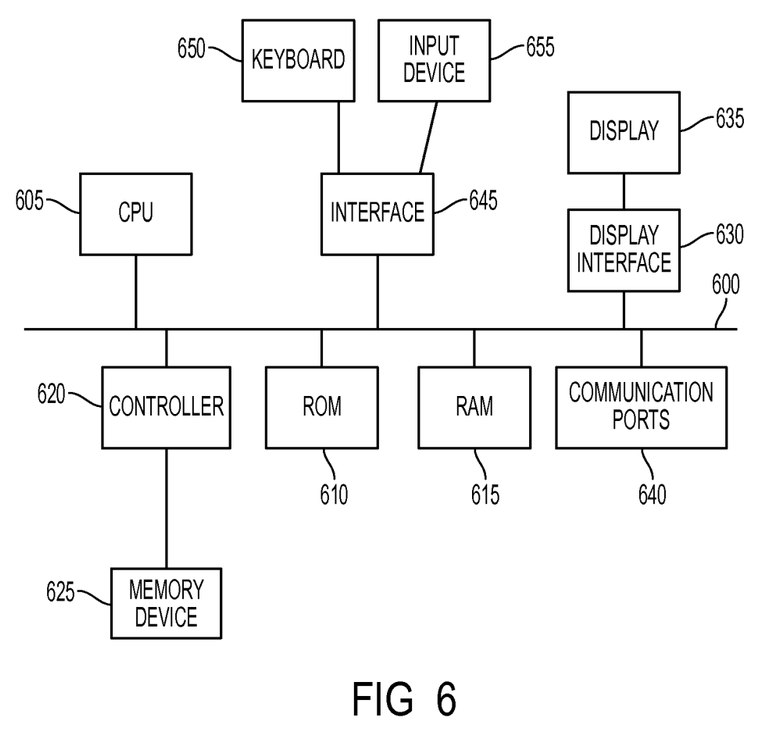
FIG. 6 is a block diagram illustrating various examples of electronic device components.

FIG. 6 depicts an example of internal hardware that may be used to contain or implement the various computer processes and systems as discussed above. For example, any of the devices shown in FIG. 1 may include similar internal hardware architecture such as that illustrated in FIG. 6. An electrical bus 600 serves as an information highway interconnecting the other illustrated components of the hardware. CPU 605 is a central processing unit of the system, performing calculations and logic operations required to execute a program. CPU 605, alone or in conjunction with one or more of the other elements disclosed in FIG. 6, is a processing device, computing device or processor as such terms are used within this disclosure. Read only memory (ROM) 610 and random access memory (RAM) 615 constitute examples of memory devices.

A controller 620 interfaces with one or more optional memory devices 625 that service as data storage facilities to the system bus 600. These memory devices 625 may include, for example, an external DVD drive or CD ROM drive, a hard drive, flash memory, a USB drive or another type of device that serves as a data storage facility. As indicated previously, these various drives and controllers are optional devices. Additionally, the memory devices 625 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 610 and/or the RAM 615. Optionally, the program instructions may be stored on a tangible computer readable medium such as a compact disk, a digital disk, flash memory, a memory card, a USB drive, an optical disc storage medium, a distributed computer storage platform such as a cloud-based architecture, and/or other recording medium.

A display interface 630 may permit information from the bus 600 to be displayed on the display 635 in audio, visual, graphic or alphanumeric format. Communication with external devices may occur using various communication ports 640. A communication port 640 may be attached to a communications network, such as the Internet, a local area network or a cellular telephone data network.

The hardware may also include an interface 645 which allows for receipt of data from input devices such as a keyboard 650 or other input device 655 such as a touch screen, image sensor (such as a camera) and/or an audio input device.

The disclosed features and functions disclosed above, as well as alternatives, may be combined into other different systems or applications. Various presently unforeseen or unanticipated alternatives, modifications, variations or improvements may be made by those skilled in the art, each of which is also intended to be encompassed by the disclosed embodiments.

The invention claimed is:

1. A method of authenticating a request to access a web service, comprising, by a processor of a web service:
   receiving, from a remote electronic device, a request to access the web service;
   generating an alphanumeric character set and encoding the character set in a barcode;
   outputting the barcode on a login page;
   receiving, from the remote electronic device, the character set and a unique identifier for an authentication application that is installed on the remote electronic device; and
   in response to receiving the character set:
      using the unique identifier to identify a user account,
      generating a home page comprising one or more functions for which the user account is authorized, and
      without requiring the user to enter a username or password, outputting the home page and permitting the remote electronic device to securely access and display the home page.

2. The method of claim 1, further comprising, by the processor of the web service before receiving the request to access the web service:
   receiving an authentication request, wherein the authentication request includes an authentication credential that corresponds to the user account and the unique identifier; and
   associating the unique identifier with the user account.

3. The method of claim 1, wherein the method is performed without a requirement to pass an encryption key from the remote electronic device to the web service.

4. The method of claim 1, further comprising, by the processor of the web service after passage of at least a threshold period of time:
   receiving a second instance of the character set and the unique identifier;
   using the second instance of the unique identifier to identify the user account;
   using the second instance of the character set to identify a user session;
   outputting an updated instance of a web page that corresponds to the user session; and
   permitting the remote electronic device to access and display the updated instance of the web page.

5. The method of claim 1, further comprising, by the processor of the web service:
   receiving, from the remote electronic device, a device parameter;
   based on the device parameter, classifying the request to access the web service as a suspicious request; and
   in response to classifying the request as a suspicious request, generating a command for an authentication credential, and waiting to permit the remote electronic device to access and display the home page until the processor receives an indication that the remote electronic device has received the authentication credential from a user of the device.

6. The method of claim 1, wherein outputting the barcode on the login page comprises generating the web page and serving it for access by a second remote electronic device, wherein the second remote electronic device and the device from which the request is received are different devices.

7. A system, comprising:
   a web service processor; and
   a non-transitory memory device containing programming instructions that, when executed, instruct the processor to:
      receive, from a remote electronic device, a request to access a web service;
      generate a random alphanumeric character set and encode the character set in a barcode;
      output the barcode on a login page;
      receive, from the remote electronic device, the character set and a unique identifier for an authentication application that is installed on the remote electronic device; and
      in response to receiving the character set:
         use the unique identifier to identify a user account,
         generate a home page comprising one or more functions for which the user account is authorized, and
         without requiring the user to enter a username or password, output the home page and permitting the remote electronic device to access and display the home page.

8. The system of claim 7, further comprising additional instructions that, when executed, instruct the processor to:

determine that a received communication comprises an authentication request that includes an authentication credential that corresponds to the user account and the unique identifier; and in response to the determining, associate the unique identifier with the user account.

9. The system of claim 7, wherein the instructions do not include any instructions that require use of an encryption key.

10. The system of claim 7, further comprising additional instructions that, when executed after passage of at least a threshold period of time, instruct the processor to:

receive a second instance of the character set and the unique identifier;

use the second instance of the unique identifier to identify the user account;

use the second instance of the character set to identify a user session;

output an updated instance of a web page that corresponds to the user session; and permit the remote electronic device to access and display the updated instance of the web page.

11. The system of claim 7, further comprising additional instructions that, when executed, instruct the processor to:

receive, from the remote electronic device, a device parameter;

based on the device parameter, classify the request to access the web service as a suspicious request; and in response to classifying the request as a suspicious request, generate a command for an authentication credential, and wait to permit the remote electronic device to access and display the home page until the processor receives an indication that the remote electronic device has received the authentication credential from a user of the device.

12. The system of claim 7, wherein the instructions to output the barcode on the login page comprise instructions to generate the web page and serve it for access by a second remote electronic device, wherein the second remote electronic device and the device from which the request is received are different devices.

13. A method of authenticating a request to access a web service, comprising, by one or more processors of an electronic device:

executing an authentication application that includes a unique identifier for the authentication application;

receiving a request to access a web service;

in response to the request, by executing a scanning application, scanning a barcode that is displayed on the login page of the web service to extract barcode data;

by executing the authentication application, without requiring user entry of an authentication credential, passing the barcode data and the unique identifier to the web service;

receiving, from the web service, an address for a web page that is associated with a user account that is associated with the unique identifier;

using a client application to automatically access the web page; and by executing the client application, displaying the web page on a display of the electronic device.

14. The method of claim 13, wherein executing the authentication application also comprises:

receiving an authentication credential for the web service, wherein the authentication credential corresponds to the user account; and passing the authentication credential and the unique identifier to the web service to associate the unique identifier with the user account.

15. The method of claim 13, wherein the method is performed without a requirement to pass an encryption key from the device to the web service.

16. The method of claim 13, further comprising, before displaying the web page:

presenting the user with a prompt to verify the request to access the web service; and waiting to receive a response to the prompt, and only displaying the web page after the response is received.

17. The method of claim 13, further comprising, before displaying the web page:

by executing the authentication application, presenting the user with a prompt to enter an authentication credential; and waiting to receive the authentication credential, and only displaying the web page after the authentication credential is received.

18. The method of claim 13, wherein using the client application to automatically access the web page comprises:

opening a hypertext transfer protocol connection to the web service;

waiting for a confirming message from the web service; and displaying the web page on the display only if the confirming message is received before a timeout threshold;

otherwise, if the confirming message is not received before the timeout threshold:

scanning an updated barcode to extract updated barcode data, and passing the updated barcode data and the unique identifier to the web service.

19. A mobile electronic device, comprising:

a processor;

an image sensor;

a display; and a non-transitory memory containing programming instructions that correspond to an authentication application having a unique identifier, a browsing application and a barcode scanning application, when the instructions for the authentication application comprises instructions that, when executed, cause the processor to:

receive a request to access a web service, in response to the request, use the scanning application to scan a barcode that is displayed on the login page of the web service and extract barcode data from the barcode, without requiring user entry of an authentication credential, pass the barcode data and the unique identifier to the web service, receive, from the web service, an address for a web page that is associated with a user account that is associated with the unique identifier, use the browsing application to automatically access the web page, and use the browsing application to display the web page on the display of the electronic device.

20. The device of claim 19, wherein the authentication application comprises additional instructions that, when executed, cause the processor to:

receive an authentication credential for the web service, wherein the authentication credential corresponds to the user account; and pass the authentication credential and the unique identifier to the web service to associate the unique identifier with the user account.

21. The device of claim 19, wherein the authentication application does not require transmission of an encryption key between the device and the web service.

22. The device of claim 19, wherein the authentication application comprises additional instructions that, when executed, cause the processor to:
   present the user with a prompt to verify the request to access the web service; and
   wait to receive a response to the prompt, and only display the web page after the response is received.

23. The device of claim 19, wherein the authentication application comprises additional instructions that, when executed, cause the processor to, before displaying the web page:
   present the user with a prompt to enter an authentication credential; and
   wait to receive the authentication credential, and only display the home page after the authentication credential is received.

24. The device of claim 19, wherein using instructions to automatically access the web page comprise instructions to:
   open a hypertext transfer protocol connection to the web service;
   wait for a confirming message from the web service; and
   display the web page on the display only if the confirming message is received before a timeout threshold;
   otherwise, if the confirming message is not received before the timeout threshold:
      scan an updated barcode to extract updated barcode data, and
      pass the updated barcode data and the unique identifier to the web service.

* * * * *